US009821860B2

(12) United States Patent
Haas et al.

(10) Patent No.: US 9,821,860 B2
(45) Date of Patent: Nov. 21, 2017

(54) MOTOR VEHICLE HAVING AN AIR DUCT THAT EXTENDS AWAY FROM A WHEEL HOUSING

(71) Applicant: Bayerische Motoren Werke Aktiengesellschaft, Munich (DE)

(72) Inventors: Thorsten Haas, Unterschleissheim (DE); Tim Dietrich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/951,598

(22) Filed: Nov. 25, 2015

(65) Prior Publication Data

US 2016/0075383 A1  Mar. 17, 2016

Related U.S. Application Data

(63) Continuation of application No. PCT/EP2014/060869, filed on May 26, 2014.

(30) Foreign Application Priority Data

May 28, 2013  (DE) ........................ 10 2013 209 867

(51) Int. Cl.
  B62D 35/00 (2006.01)
  B62D 25/02 (2006.01)
  B62D 25/16 (2006.01)
  B60R 13/04 (2006.01)

(52) U.S. Cl.
  CPC ............. *B62D 35/00* (2013.01); *B60R 13/04* (2013.01); *B62D 25/02* (2013.01); *B62D 25/16* (2013.01); *B62D 25/161* (2013.01); *B62D 35/008* (2013.01)

(58) Field of Classification Search
  CPC ........ B60R 13/04; B62D 25/02; B62D 25/16; B62D 25/161; B62D 35/00; B62D 35/005; B62D 35/008
  USPC ......................... 296/181.5, 193.05, 198, 208
  See application file for complete search history.

(56) References Cited

U.S. PATENT DOCUMENTS

2009/0189417 A1   7/2009  Wolkersdorfer

FOREIGN PATENT DOCUMENTS

| DE | 100 47 731 A1 | 4/2002 | |
| DE | 10213188 A1 * | 10/2003 | ........... B62D 35/008 |
| DE | 20 2005 011 175 U1 | 11/2005 | |
| DE | 10 2008 006 103 A1 | 7/2009 | |
| DE | 10 2010 050 988 A1 | 6/2011 | |
| DE | 102011003339 A1 * | 8/2012 | ........... B60Q 1/0017 |
| EP | 1 762 470 B1 | 7/2012 | |
| FR | 2 897 833 A3 | 8/2007 | |
| JP | 62-23875 A | 1/1987 | |
| JP | 64-8480 U | 1/1989 | |

(Continued)

OTHER PUBLICATIONS

English Translation of DE 102 13 188; retrieved on Dec. 7, 2016 from PatentTranslate located at www.epo.org.*

(Continued)

*Primary Examiner* — Jason S Daniels
(74) *Attorney, Agent, or Firm* — Crowell & Moring LLP

(57) ABSTRACT

A motor vehicle includes an air duct between a front wheel housing and a side wall of the motor vehicle, the air duct extends between an inwardly directed embossment of the side wall and a wheel housing cover which partially covers the embossment externally at a distance therefrom.

14 Claims, 4 Drawing Sheets

(56) References Cited

FOREIGN PATENT DOCUMENTS

| JP | 2001-278123 A | 10/2001 |
|----|---------------|---------|
| JP | 2012-183945 A | 9/2012 |
| JP | 2013-71462 A | 4/2013 |

OTHER PUBLICATIONS

English translation of DE 100 47 731 (applicant cited); retrieved Mar. 20, 2017 via PatentTranslate located at www.epo.org.*
International Search Report (PCT/ISA/210) issued in PCT Application No. PCT/EP2014/060869 dated Aug. 1, 2014 with English-language translation (four (4) pages).
German Search Report issued in counterpart German Application No. DE 10 2013 209 867.7 dated Dec. 30, 2013 with partial English-language translation (ten (10) pages).

* cited by examiner

MOTOR VEHICLE HAVING AN AIR DUCT THAT EXTENDS AWAY FROM A WHEEL HOUSING

CROSS REFERENCE TO RELATED APPLICATIONS

This application is a continuation of PCT International Application No. PCT/EP2014/060869, filed May 26, 2014, which claims priority under 35 U.S.C. §119 from German Patent Application No. 10 2013 209 867.7, filed May 28, 2013, the entire disclosures of which are herein expressly incorporated by reference.

BACKGROUND AND SUMMARY OF THE INVENTION

The invention relates to a motor vehicle having an air duct that extends away from a wheel housing. The wheel housing may be, in particular, a front wheel housing. The motor vehicle may be, in particular, a passenger car.

EP 1 762 470 B1 discloses a motor vehicle wing which has an opening that permits the removal of air. The wing, moreover, has first fastening devices which are connected fixedly to the wing and are capable of permitting the fastening of a closure element that covers the opening which is formed in the wing. The first fastening devices are composed in one piece with the wing and protrude with the inner side of the wing. The first fastening devices are substantially cylindrical pins. The first fastening devices can be situated at the free end of exposed walls which are situated such that they project from the inner side of the wing. The fastening devices can be positioned at regular intervals on the outline of the opening.

Furthermore, EP 1 762 470 B1 discloses a method for obtaining a motor vehicle wing, in which a closure element is placed in front of an opening which is formed on the wing. The closure element is positioned in a first step on first fastening devices which are arranged so as to project from the inner side of the wing. Second fastening devices subsequently are brought into contact with the first fastening devices by the closure element being pressed against the first fastening devices. The first fastening devices are substantially cylindrical pins. A high outlay of manufacturing and assembly costs is disadvantageous here, which additionally ensures noticeable wheel ventilation only in the case of wings which project laterally to a considerable extent.

A wheel ventilation means is also known, in which, as shown in FIG. 1 in a view obliquely from above of a front left wheel housing 101, there is a perpendicular slot-shaped opening 102 in a side wall 103 of a passenger car 104. As shown in FIG. 2 as a sectional view A-A from FIG. 1, the opening 102 is adjoined in the inward direction (in relation to the passenger car 104) by a plastic component 105. The plastic component 105 is open on two sides. An open end 106 serves as an air inlet opening into the wheel housing 101 and with its other open end 107 serves as an air outlet opening into the opening 102. As a result, the plastic component 105 provides an air duct 108 between the front wheel housing 101 and the side wall 103 or the opening 102 situated therein. The plastic component 105 is connected to the side wall 103 at a front edge 109 of the side wall 103, which edge 109 adjoins the wheel housing 101. Furthermore, the plastic component 105 is connected via a cover 110 to a rear edge 111 of the side wall 103 at the opening 102. This type of wheel ventilation is also associated with a high outlay of manufacturing and assembly costs.

It is the object of the present invention to overcome the disadvantages of the prior art at least partially and, in particular, to provide a possibility for effective wheel ventilation by way of comparatively simple and inexpensive measures.

This and other objects are achieved by way of a motor vehicle having an air duct that extends away from a wheel housing, the air duct running between a side wall of the motor vehicle and a wheel housing cover (fender cover) which covers the side wall at a spacing. That region of the side wall which is covered there by the wheel housing cover at a spacing can also be called an "air guiding region" of the side wall in the following text. The air guiding region therefore corresponds to that region of the side wall which belongs to the air duct.

Such a motor vehicle has the advantage that the air duct can be realized by way of comparatively simple and inexpensive measures. No opening needs to be made in the side wall, which maintains the stability of the latter in a practically undiminished manner. The wheel housing cover is likewise already present and may be used further without any or with only minor structural modifications. As a consequence, no dedicated component is required for the air duct, which saves tooling, material and assembly costs.

The air duct is therefore formed, in particular, by the air guiding region of the side wall and a region of the wheel housing cover, which region covers the air guiding region. An air inlet region of the air duct therefore opens, in particular, in or on the wheel housing in such a way that, during driving, air is pressed out of the wheel housing into the air duct. The air duct can run completely or at least in sections between the side wall of the motor vehicle and the wheel housing cover which covers the side wall at a spacing.

The side wall may be, in particular, part of a vehicle body and/or part of a bumper.

In one refinement the air duct runs at least in sections between an inwardly directed impressed formation of the side wall and a wheel housing cover which covers the impressed formation at a spacing. In other words, the air guiding region is formed at least partially by the impressed formation. The impressed formation can be made in the side wall with low outlay. The air duct is therefore formed by the impressed formation and that region of the wheel housing cover which covers the impressed formation. Since the impressed formation is directed inward (in the direction of the vehicle), the air duct opens at a position which is comparatively far to the inside in the wheel housing, which makes particularly effective ventilation possible. It is a further advantage that the air duct can be provided independently of a shape or a presence of a laterally projecting wing.

The wheel housing cover may cover an outer edge of the wheel arch or wheel housing in sections or completely.

In one further development the impressed formation is an elongate impressed formation which extends, in particular, in a longitudinal direction of the vehicle, for example from the front to the rear. Here, the impressed formation may also extend slightly obliquely or obliquely in sections with respect to the longitudinal direction of the vehicle.

In a further refinement the elongate impressed formation or the air guiding region of the side wall is an impressed formation which is rectilinear at least in sections along its longitudinal extent. It may run, in particular, in a rectilinear manner on the section which is covered by the wheel housing cover.

The elongate impressed formation or the air guiding region of the side wall may be attached, in particular, to a lower edge of the side wall.

The elongate impressed formation which forms the air guiding region of the side wall may have an (inwardly directed) tub shape in cross section, in particular with a bottom which is wide (along the vertical) and in each case one outwardly projecting side wall on the upper side and lower side. The side wall may be bent or curved. The bottom may be arched slightly outward.

In another refinement a height of the impressed formation is lower than a height of the wheel arch. The height of the impressed formation may be approximately half of a height of the outer edge of the wheel arch, in particular not more than half the height of the wheel arch.

The impressed formation and that section of the wheel housing cover which covers the impressed formation may be arranged at least substantially flush with respect to one another toward the wheel arch or wheel housing.

In one further refinement the impressed formation extends as far as behind the wheel housing cover. As a result, an air outlet opening of the air duct can be provided behind the wheel housing cover (in particular, in relation to a longitudinal extent of the vehicle) in a simple way. Here, the wheel housing cover covers the impressed formation only over part of the length of the impressed formation, preferably starting at the wheel housing. The non-covered part then serves as the air outlet opening. The air duct therefore has, in particular, a length in the direction of the air flow which corresponds at least to a width of the wheel housing cover, in particular is even larger than the width of the wheel housing cover.

The impressed formation may continue as far as a door region, in particular as an impressed formation of an outer side wall of a door, for example a driver's door.

In yet another refinement the wheel housing cover is fastened in the air guiding region, in particular in the impressed formation, for example by way of the use of one or more fastening elements. As a result, that region of the wheel housing cover which arches over the air guiding region is stabilized or reinforced mechanically, which is advantageous, in particular, in the case of a thin wheel housing cover. For example, fluttering of the wheel housing cover in the air guiding region at a high air flow speed can thus be prevented.

The wheel housing cover may be latched, in particular, in the air guiding region, in particular in the impressed formation, for example by way of using one or more latching elements, for example pins. The pins can be guided, in particular, through one or more holes in the side wall.

The wheel housing cover may also be fastened to the side wall outside the air guiding region, in particular directly next to the air guiding region or in the immediate vicinity of the air guiding region, in particular above and/or below the air guiding region. To achieve high rigidity in the region of the impressed formation, one preferred development the wheel housing cover is fastened, in particular latched, on both sides of the air guiding region.

In one further development the wheel housing cover is structurally reinforced in the region of the air guiding region or on its region which covers the air guiding region. This can be achieved, for example, by way of the provision of a reinforcing structure, in particular on the inner side. The reinforcing structure may be, for example, reinforcing ribs or reinforcing struts which run in the wall of the wheel housing cover. As an alternative or in addition, the reinforcing structure may have reinforcing elements which protrude on the inner side (that is to say, on the side which faces the air guiding region of the side wall), such as at least one strut.

In a still further refinement the wheel housing cover has ribs which protrude into the air duct. A reinforcement of the wheel housing cover (in particular, if the ribs are contiguous), steering of the air stream, and/or a protection of the side wall against small flying stones ("stone chipping"), etc., can be achieved by way of the ribs. In one preferred development for effective air flow and effective protective function, the ribs are oriented at least substantially horizontally, in particular are oriented only at least substantially horizontally. It is also preferred for this reason that a plurality of ribs run at least approximately in parallel or in a co-linear direction. In particular, an arrangement of ribs which are arranged in a lattice-shaped or box-shaped manner may therefore be ruled out.

It is preferred for effective air guiding, reinforcing and protective function that the ribs extend over at least substantially the entire width of the air duct.

In yet a further refinement, the air guiding region, in particular the impressed formation, is covered at least in regions by a protective lining which can be covered at least partially on the outer side, in particular, by the wheel housing cover at a spacing. The protective lining protects the air guiding region of the side wall, in particular against mechanical loading such as abrasion, scratches, etc., for example as a result of small flying stones, etc. The air duct can then be formed, in particular, between or by way of the protective lining and the wheel housing cover. The protective lining may bear, in particular tightly or with only a small gap, against the air guiding region. The result is that an auxiliary air flow between the air guiding region of the side wall and the protective lining is kept small or is even prevented practically completely. In order to suppress the auxiliary air flow, the protective lining may be folded over in the direction of the air guiding region, for example, at the air inlet opening of the air duct. The protective lining can be designed and assembled simply. The protective lining may be latched or clipped, in particular, on the side wall of the motor vehicle, for example by use of one or more pins. Here, the protective lining may also or only be fastened in the air guiding region, in particular latched. During assembly, if the protective lining and the wheel housing cover are separate parts, first of all the protective lining and then the wheel housing cover may therefore be attached. The protective lining may be, in particular, narrower (in the direction of the air duct) than the wheel housing cover, in order that it is covered visually by the wheel housing cover. However, it may in principle also have, for example, an identical width or be even wider than the wheel housing cover.

In one refinement, furthermore, the protective lining is integrated as a protective lining region into the wheel housing cover. The air duct can then be formed solely by the wheel housing cover at least in sections where the wheel housing cover has the protective lining region. The protective lining region may be, in particular, that region of the wheel housing cover which is directly adjacent to the air guiding region of the side wall. In comparison with the separate fastening of the protective lining and the wheel housing cover, this refinement simplifies manufacturing and assembly. The wheel housing cover can, furthermore, be attached simply from the outside on the side wall. A further advantage of this refinement consists in the fact that the protective lining region reinforces the wheel housing cover.

In one refinement, moreover, that the protective lining region is rectilinear in cross section at least in regions.

It is also one refinement that the protective lining region is connected, at a rectilinear front edge or edge section which is directed into the wheel housing, via an integral hinge to an insert part. The insert part can be pivoted, in particular, about the integral hinge into the air duct, in particular into the wheel housing cover between the protective lining region and the region which covers the protective lining region at a spacing. This makes particularly simple assembly of the insert part possible. The wheel housing cover may, in particular, be fastened to the side wall first of all by way of an insert part which has not yet been pivoted in, which can facilitate assembly. The insert part is pivoted into the wheel housing cover only after this. The insert part may reinforce the wheel housing cover to an even greater extent.

It is also one refinement that the insert part has struts, in particular ribs. As a result, an even higher reinforcement and protection against objects which fly up (such as small stones, grit, etc.) can be achieved. The struts may be, in particular, horizontally or obliquely horizontally running struts, in order to not impede an air flow substantially. The struts can be shaped in an aerodynamically effective manner, for example can have an aerofoil shape.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
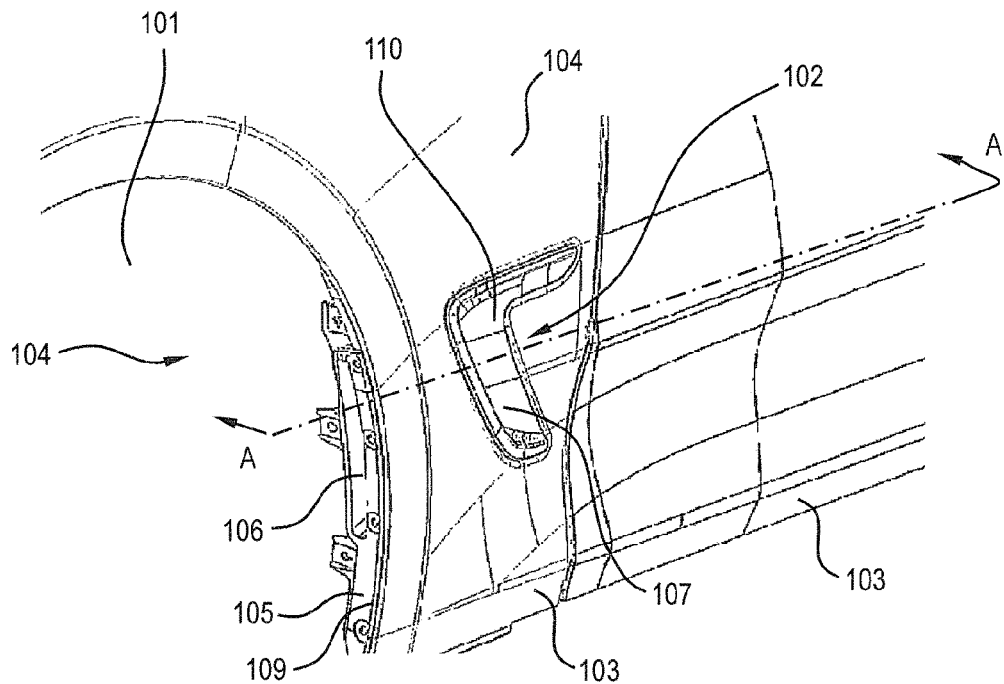
FIG. 1 is a perspective view of a known wheel ventilation device of a passenger car.
Figure 2:
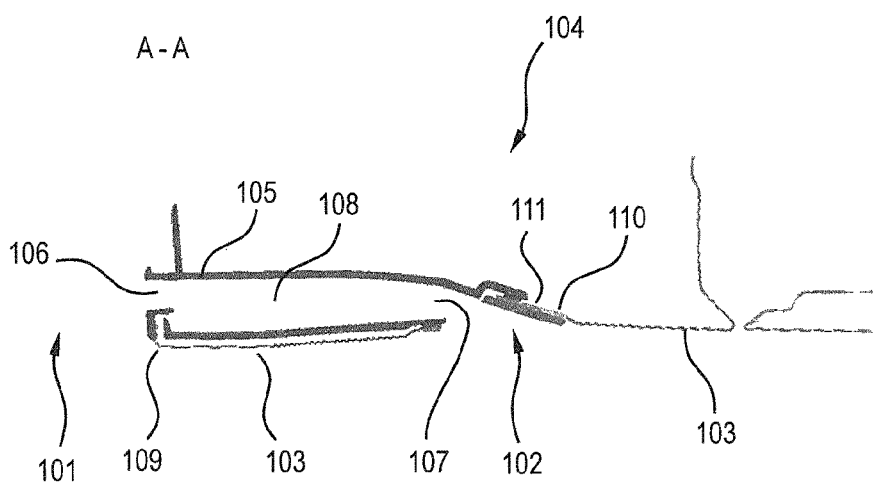
FIG. 2 is a cross-sectional view taken along line A-A of FIG. 1.
Figure 3:
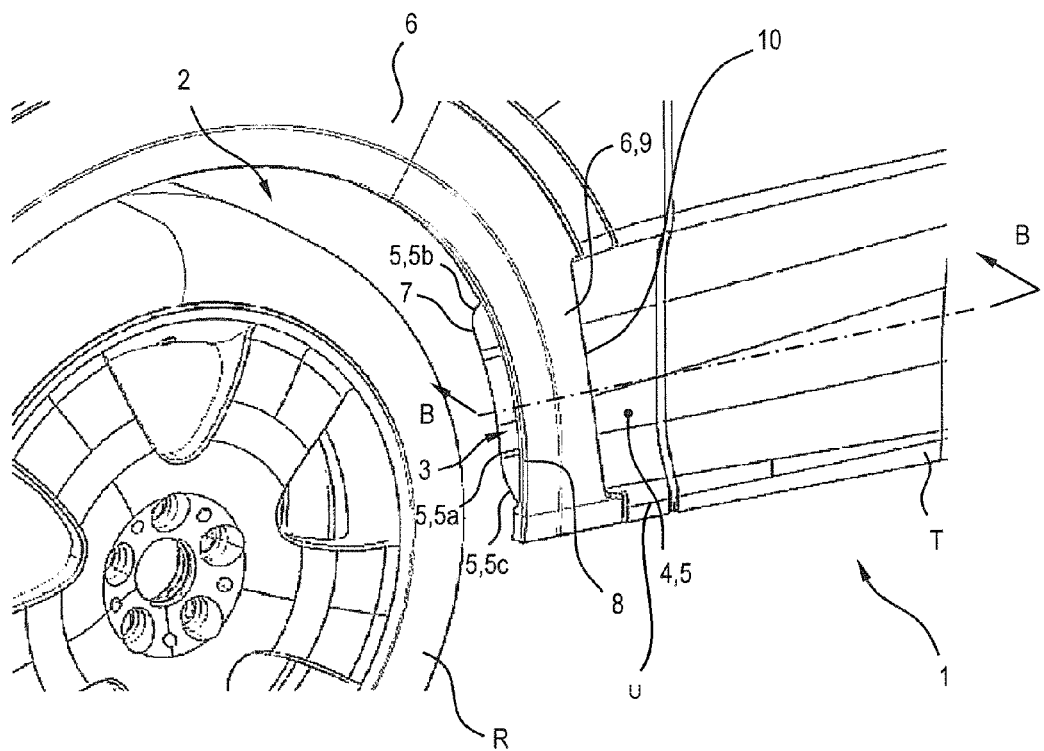
FIG. 3 is a perspective view of part of a passenger car in the region of its front left-hand wheel housing with an air duct between the wheel housing and the side wall according to a first exemplary embodiment of the invention.
Figure 4:
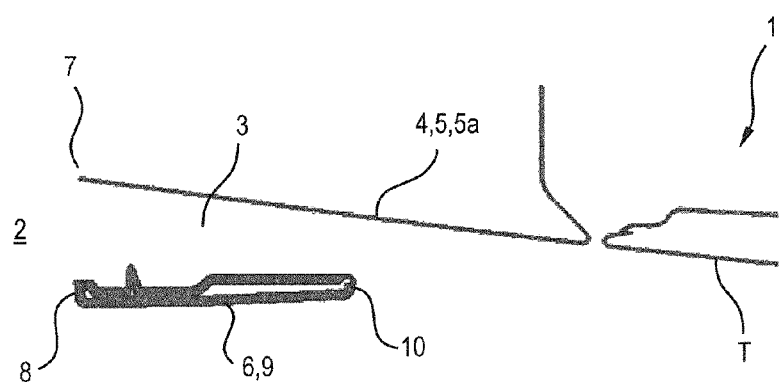
FIG. 4 is a cross-sectional view taken along line B-B of FIG. 3.

FIG. 3 shows a perspective (oblique) view of part of a passenger car 1 in the region of its front left-hand wheel housing 2, in which there is a corresponding wheel R. FIG. 4 shows the part of the passenger car 1 as a section B-B from FIG. 3 in plan view.

An air duct 3 runs between the wheel housing 2 and a side wall 4 of the passenger car 1. The air duct 3 is situated between an inwardly directed impressed formation 5 of the side wall 4 and a wheel housing cover 6 which covers the impressed formation 5 partially on the outer side at a spacing therefrom. Here, the wheel housing cover 6 completely covers an outer edge of the wheel housing 2.

The impressed formation 5 extends in the longitudinal extent of the passenger car 1 as far as behind the wheel housing cover 6. In other words, the wheel housing cover 6 covers only a part or section of the impressed formation 5, namely that section which directly adjoins the wheel housing cover 6. As a consequence, air can flow out of the wheel housing 2 into the air duct 3, can flow rearward between the impressed formation 5 and the wheel housing cover 6 through the air duct 3, and can flow out at a section of the side wall 4, which section is situated behind the wheel housing cover 6. The air inlet opening is therefore delimited, in particular, by way of the front edge 7 of the impressed formation 5 and the front edge 8 of that section 9 of the wheel housing cover 6 which covers the impressed formation 5. In particular, the rear edge 10 of the wheel housing cover 6 together with that part of the impressed formation 5 which is covered by it serves as the air outlet opening.

The impressed formation 5 is, as can be seen, in particular, from FIG. 4, an impressed formation which is rectilinear along its at least approximately horizontal longitudinal extent. It runs as far as into a region of a side door T. Furthermore, the impressed formation 5 has the property that it adjoins a lower edge U of the side wall 4, as can be seen, in particular, from FIG. 3. As can likewise be seen from FIG. 3, the impressed formation 5 has a tub shape in cross section with a bottom 5a which is wide (along the vertical) and in each case one outwardly projecting shorter side wall 5b and 5c on the upper side and lower side, respectively. The side walls 5b and 5c are curved outward. The bottom 5a is arched slightly outward.

A height of the impressed formation 5 (along the vertical) is lower than the height of the wheel housing 2 and corresponds approximately to half the height of the outer edge of the wheel arch 2.

Figure 5:
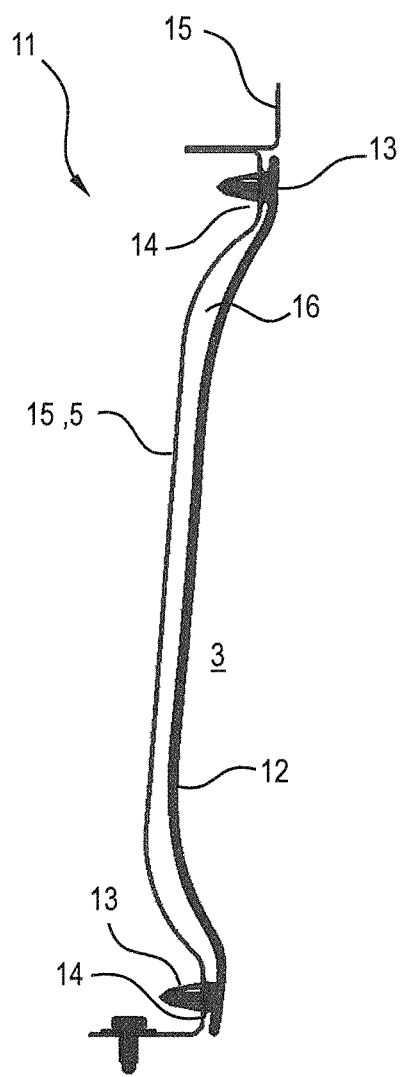
FIG. 5 is a vertical section in a front view of a side wall of a passenger car in a region of the air duct between the wheel housing and the side wall according to a second exemplary embodiment of the invention.

FIG. 5 shows a side wall 15 of a passenger car 11 as a sectional illustration through an impressed formation 5 in the region of the wheel housing cover in a front view. The passenger car 11 is of similar construction to the passenger car 1. The wheel housing cover, for example 6, is not shown but is present in principle. The impressed formation 5 is now covered in regions by way of a protective lining 12. The protective lining 12 extends in the longitudinal direction of the passenger car 11 (that is to say, at least approximately perpendicularly with respect to the plane of the image) along the impressed formation 5. The protective lining 12 consists, for example, of plastic here. It preferably adjoins on or in the vicinity of the wheel housing 2 or the front edge 7 of the impressed formation 5 and extends rearward on the impressed formation 5. The protective lining 12 can extend as far as in front of the air outlet opening, can extend as far as the air outlet opening, or can extend as far as behind the air outlet opening. Its extent along the impressed formation 5 is therefore not restricted in principle, but it is preferred that it is covered at least partially on the outer side by the wheel housing cover 6 at a spacing therefrom. The impressed formation 5 is protected against stone chipping, etc. by way of the protective lining 12.

The protective lining 12 is latched on the side wall 15, to be precise by use of pins 13 which are attached to the protective lining and are introduced through corresponding holes 14 in the side wall 15. The pins 13 and holes 14 are situated on the upper side and lower side outside the region of the impressed formation 5, in order not to excessively reduce the flow cross section of the air duct 3. Here, the pins 13 and holes 14 are positioned directly at, or at a small spacing from, the impressed formation 5. The protective lining 12 can also be fastened in the impressed formation 5, for example latched, for example by way of pins.

There may be a narrow gap 16 between the protective lining 12 and the impressed formation 5, which gap 6 is shown in an exaggeratedly wide manner here. This gap 16 may facilitate simple mounting of the protective lining 12. In addition, it is prevented in this way that the protective lining 12 rubs on the impressed formation 5 and, for example, causes paint damage as a result. The gap 16 is preferably not so wide, however, that it can conduct a significant auxiliary air flow next to the air duct 3, if at all. The air duct 3 is formed in the region of the protective lining 12 by way of the protective lining 12 and that part of the wheel housing cover 6 which covers it. The gap 16 may, for example, be covered on the front side, for example by way of a bent-over lug-like edge region of the protective lining 12. As an alternative, the protective lining 12 rests at least substantially without a gap on the impressed formation 5.

Figure 6:
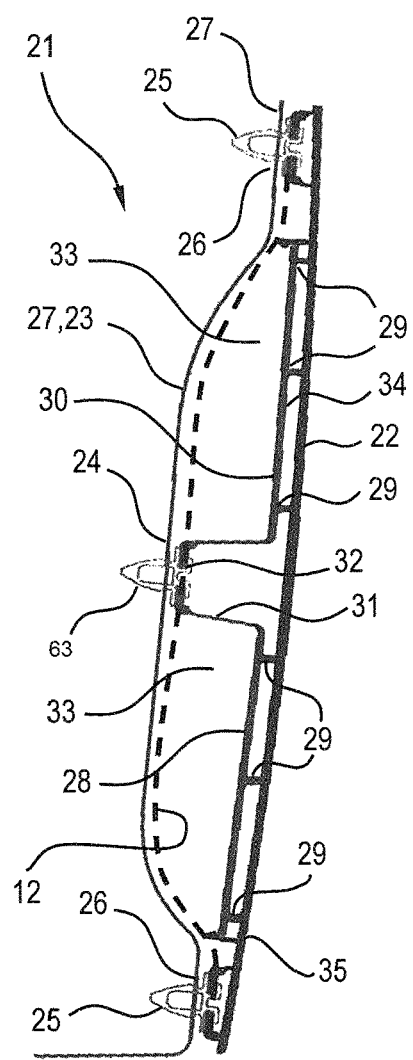
FIG. 6 is a vertical section in a front view of a side wall of a passenger car in a region of the air duct between the wheel housing and the side wall according to a third exemplary embodiment of the invention.

FIG. 6 is a sectional illustration in a front view through an impressed formation 23 in the region of a wheel housing cover 22 of a passenger car 21. The passenger car 21 is of similar construction to the passenger car 1. In contrast to the passenger car 1, the wheel housing cover 22 is now also fastened in the impressed formation 23, to be precise is latched by way of at least one pin 63. The at least one pin 63 is introduced through at least one corresponding hole 24 in the impressed formation 23. Otherwise, just like the wheel housing cover 6, for example, the wheel housing cover 22 can be latched on the side wall 27 by use of pins 25 and holes 26 outside the impressed formation 5, in particular on the upper side and/or lower side of the impressed formation 5. This achieves a stabilization of the wheel housing cover 22 in the region of the impressed formation 23, which counteracts, for example, fluttering there of the wheel housing cover 22.

On its (inner) side which faces the impressed formation 23, the wheel housing cover 22 can have a reinforcing structure 28 which has, in particular, a plurality of struts 29 which extend in the longitudinal direction of the impressed formation 23 (perpendicularly with respect to the plane of the image) and support an inner lining 30. The inner lining 30 has a pot-like part region 31 which extends in the direction of the impressed formation 23 and the base 32 of which holds the at least one pin 63. The region between the inner lining 30 and the impressed formation 23 provides the air duct 33, whereas the region 34 between the inner lining 30 and an outer wall 35 of the wheel housing cover 22 preferably either has such a small cross section that an only small auxiliary air flow to the air duct 33 is conducted through it, or the region 34 can conduct no air flow, for example on account of a lining which is, in particular, closed on the front side.

As indicated by way of the dashed line, the wheel housing cover 22 can cover a protective lining 12. The protective lining 12 may be shaped in a fitting manner in this regard, for example with cutouts in the region of the holes 26 for guiding the pins 25 through. As an alternative or in addition, the pins 25 and holes 26 of the wheel housing cover 22 may be further remote from the impressed formation 23 than the protective lining 12. The air duct 33 is then delimited laterally by the protective lining 12 and the wheel housing cover 22.

Figure 7:
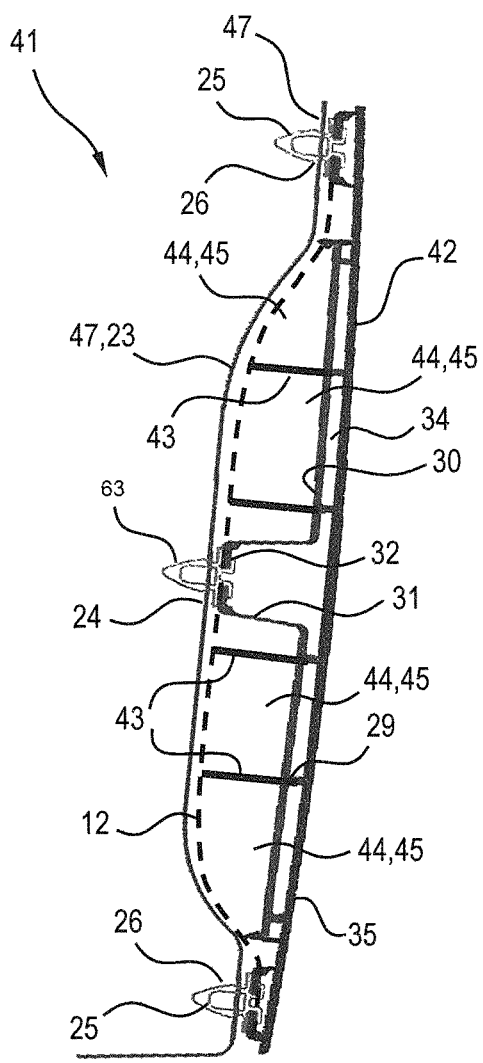
FIG. 7 is a vertical section in a front view of a side wall of a passenger car in a region of the air duct between the wheel housing and the side wall according to a fourth exemplary embodiment of the invention.

FIG. 7 shows a sectional illustration in a front view through an impressed formation 23 of a side wall 47 in the region of a wheel housing cover 42 of a passenger car 41. The passenger car 41 is of similar construction to the passenger car 21. In contrast to the wheel housing cover 22, the wheel housing cover 42 now has ribs 43 which protrude in the direction of the impressed formation 23 and run horizontally or in an obliquely inclined manner with respect to the horizontal ("obliquely horizontally") at least approximately along the impressed formation 23. Obliquely horizontal ribs can have, in particular, an inclination angle of 45° or less, in particular of 30° or less, in particular of 15° or less, with respect to the horizontal.

The ribs 43 can be seated, in particular, on the protective lining 12 if the latter is present. If there is no protective lining 12 present, the ribs 43 may sit, in particular, on the impressed formation 23. The ribs 43 reduce eddying of the air flow in the air duct 44 or in its part regions 45 which are separated by way of the ribs 43. In addition, the ribs 43 act as additional deflector walls for stone chipping or small stones which are flung up, etc. In general, however, the ribs can also lie obliquely, for example.

Figure 8:
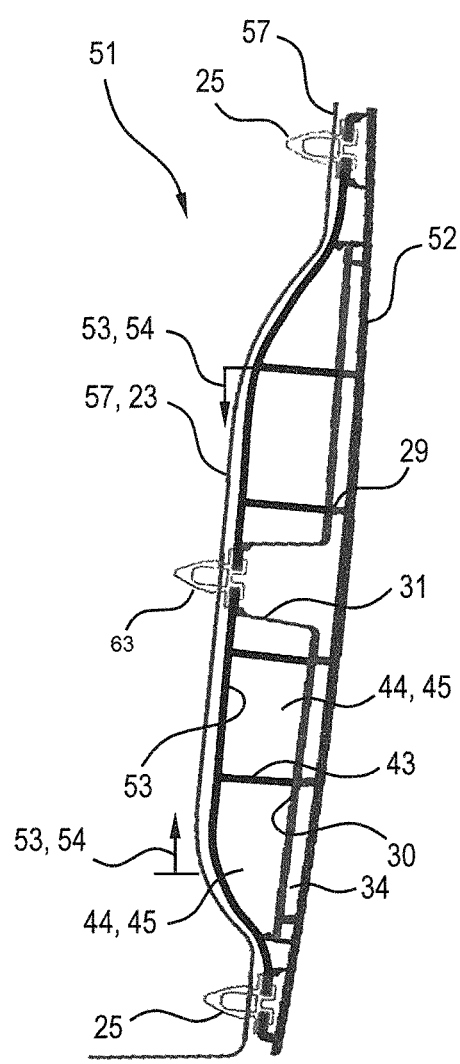
FIG. 8 is a vertical section in a front view of a side wall of a passenger car in a region of the air duct between the wheel housing and the side wall according to a fifth exemplary embodiment of the invention.

FIG. 8 shows a sectional illustration in a front view through an impressed formation 23 of a side wall 57 in the region of a wheel housing cover 52 of a passenger car 51. The passenger car 51 is of similar construction to the passenger car 41 with the protective lining 12. However, the protective lining and the wheel housing cover are now no longer separately manufactured components which are mounted on the side wall 57, but rather are a single component. In other words, the protective lining is therefore integrated as a protective lining region 53 into the wheel housing cover 52. This facilitates manufacture and assembly and increases rigidity of the wheel housing cover 52 in the region of the impressed formation 23. The wheel housing cover 52 is of at least largely rectilinear cross section in the region of the impressed formation 23. The ribs 43 may have been introduced into the air duct 44 as insert part/parts. To this end, the ribs 43 may be connected to the rectilinear region 54, in particular at a front edge of the rectilinear region 54, preferably via an integral hinge (without depiction). The ribs 43 can therefore be fastened, in particular, to the front edge of the rectilinear region 54 and can be pivoted into the air duct 44 by means of the integral hinge. This further facilitates assembly. The ribs 43 can be contiguous with one another, in particular as parts of a single insert part.

It goes without saying that the present invention is not restricted to the exemplary embodiments which are shown.

In general, "a", "one", etc. can be understood to mean a singular or a plural, in particular in the sense of "at least one" or "one or more", etc., as long as this is not explicitly ruled out, for example by way of the expression "precisely one", etc.

A numerical value can also include precisely the specified number and a customary tolerance range, as long as this is not explicitly ruled out.

| List of Designations | |
| --- | --- |
| 1 | Passenger car |
| 2 | Wheel housing |
| 3 | Air duct |
| 4 | Side wall |
| 5 | Impressed formation |
| 5a | Bottom of the impressed formation |
| 5b | Upper side wall of the impressed formation |
| 5c | Lower side wall of the impressed formation |
| 6 | Wheel housing cover |
| 7 | Front edge of the impressed formation |
| 8 | Front edge of the wheel housing cover |
| 9 | Section |
| 10 | Rear edge |

-continued

List of Designations

| | |
|---|---|
| 11 | Passenger car |
| 12 | Protective lining |
| 13 | Pin |
| 14 | Hole |
| 15 | Side wall |
| 16 | Gap |
| 21 | Passenger car |
| 22 | Wheel housing cover |
| 23 | Impressed formation |
| 24 | Hole in the impressed formation |
| 25 | Pin |
| 26 | Hole outside the impressed formation |
| 27 | Side wall |
| 29 | Strut |
| 30 | Inner lining |
| 31 | Part region |
| 32 | Base |
| 33 | Air duct |
| 34 | Region |
| 35 | Outer wall |
| 38 | Reinforcing structure |
| 41 | Passenger car |
| 42 | Wheel housing cover |
| 43 | Rib |
| 44 | Air duct |
| 45 | Part region |
| 47 | Side wall |
| 51 | Passenger car |
| 52 | Wheel housing cover |
| 53 | Protective lining region |
| 54 | Rectilinear region |
| 57 | Side wall |
| 101 | Wheel housing |
| 102 | Opening |
| 103 | Side wall |
| 104 | Passenger car |
| 105 | Plastic component |
| 106 | Open end serving as air inlet opening |
| 107 | Open end serving as air outlet opening |
| 108 | Air duct |
| 109 | Front edge of the side wall |
| 110 | Cover |
| 111 | Rear edge of the side wall |
| R | Wheel |
| T | Door |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    a wheel housing of the motor vehicle;
    a side wall of the motor vehicle, the side wall having an inwardly directed impressed formation;
    a wheel housing cover that covers at least a portion of a fender; and
    an air duct that extends away from the wheel housing and runs between the side wall of the motor vehicle and the wheel housing cover, wherein
        the wheel housing cover covers the inwardly directed impressed formation of the side wall at a spacing therefrom to form at least a section of the air duct, and
        the impressed formation of the side wall extends behind the wheel housing cover in a longitudinal direction of the motor vehicle.

2. The motor vehicle according to claim 1, wherein the air duct runs, at least in sections, between the inwardly directed impressed formation of the side wall and the wheel housing cover that covers the impressed formation at the spacing therefrom.

3. The motor vehicle according to claim 2, wherein the impressed formation of the side wall has an impressed formation that is curved inwardly in a tub-shape viewed in cross-section.

4. The motor vehicle according to claim 2, wherein the impressed formation of the side wall has a height in a vertical direction of the motor vehicle that is lower than a height of the wheel housing of the motor vehicle.

5. The motor vehicle according to claim 1, wherein the impressed formation of the side wall extends as far as into a door of the motor vehicle.

6. The motor vehicle according to claim 1, wherein the wheel housing cover is latched in a region of the side wall on a side of the air duct.

7. The motor vehicle according to claim 1, wherein the wheel housing cover comprises ribs that protrude into the air duct.

8. The motor vehicle according to claim 7, wherein the ribs protrude horizontally into the air duct.

9. A motor vehicle, comprising:
    a wheel housing of the motor vehicle;
    a side wall of the motor vehicle, the side wall having an inwardly directed impressed formation;
    a wheel housing cover; and
    an air duct that extends away from the wheel housing and runs between the side wall of the motor vehicle and the wheel housing cover,
    wherein the impressed formation of the side wall has a rectilinear form at least in sections along a longitudinal extent,
    the wheel housing cover covers the rectilinear section of the inwardly directed impressed formation of the side wall at a spacing therefrom to form at least a section of the air duct, and
    the impressed formation of the side wall extends behind the wheel housing cover in a longitudinal direction of the motor vehicle.

10. A motor vehicle, comprising:
    a wheel housing of the motor vehicle;
    a side wall of the motor vehicle;
    a wheel housing cover;
    an air duct that extends away from the wheel housing and runs between the side wall of the motor vehicle and the wheel housing cover, wherein the wheel housing cover covers the side wall at a spacing therefrom to form the air duct; and
    a protective lining covering a region of the side wall of the motor vehicle that forms the air duct,
    the wheel housing cover at least partially covering the protective lining on an outer side at a spacing from the protective lining.

11. The motor vehicle according to claim 10, wherein the protective lining is integrated as a protective cover region into the wheel housing lining.

12. The motor vehicle according to claim 11, wherein
    the protective lining region is rectilinear at least in regions when viewed in cross-section,
    the protective lining region is connected, at a front edge which is directed into the wheel housing, via an integral hinge to at least one insert part, and
    the at least one insert part is pivotable about the integral hinge into the wheel housing cover between the protective lining region and a region which covers the protective lining region at a spacing.

13. The motor vehicle according to claim 12, wherein the insert part comprises horizontally or obliquely horizontally extending struts.

14. The motor vehicle according to claim 13, wherein the struts are ribs.

* * * * *